United States Patent [19]

Tury et al.

[11] Patent Number: 5,047,094
[45] Date of Patent: * Sep. 10, 1991

[54] ANTI CORROSION METAL COMPLEX COMPOSITIONS

[75] Inventors: Bernard Tury, Prestwich; Glyn R. John, Lowton; Noreen L. Thomas, Upton, all of England

[73] Assignee: Imperial Chemical Industrials, PLC, Hertfordshire, England

[*] Notice: The portion of the term of this patent subsequent to Feb. 16, 2005 has been disclaimed.

[21] Appl. No.: 340,782

[22] Filed: Apr. 20, 1989

Related U.S. Application Data

[60] Division of Ser. No. 117,330, Dec. 18, 1987, abandoned, which is a division of Ser. No. 21,521, Feb. 26, 1989, Pat. No. 4,725,320, which is a continuation of Ser. No. 876,007, Jun. 19, 1986, abandoned.

[30] Foreign Application Priority Data

Jun. 19, 1985 [GB] United Kingdom ............... 8515561

[51] Int. Cl.$^5$ ............................................. C23C 22/48
[52] U.S. Cl. .................................... 148/248; 148/273; 148/274
[58] Field of Search ........................ 148/248, 273, 274

[56] References Cited

U.S. PATENT DOCUMENTS 4,725,320 2/1988 Tury .................................... 148/254

Primary Examiner—Sam Silverberg
Attorney, Agent, or Firm—Cushman, Darby & Cushman

[57] ABSTRACT

This invention relates to a process for coating a surface of a metal I, such as iron, steel, zinc, copper, tin or aluminum with a hydroxy oxime complex of metal II which may be lead of zinc. The complex can be incorporated in a surface coating composition.

8 Claims, No Drawings

ANTI CORROSION METAL COMPLEX COMPOSITIONS

This application is a division of application Ser. No. 07/117,330, filed Dec. 18, 1987 now abandoned which is a division of Ser. No. 07/21,521, filed Feb. 26, 1987, now U.S. Pat. No. 4,725,320 which is a continuation of Ser. No. 876,007, filed June 19, 1986, now abandoned.

This invention relates to the use of compositions based on certain metal complexes as corrosion inhibitors for metals.

Corrosion inhibitors are known which are applied to a metal surface and form a protective coating which does not need to be continuously replenished, and zinc phosphate and chromate treatments are conventionally used for this purpose.

Other agents, such as tannic acid, act as so called "rust converters" on application to an already rusted surface. However such agents generally have a limited effect in terms of the inhibition of further rusting.

In our European Patent Application No 84302377 (Publ.125.025) we describe a process for the inhibition of the corrosion of metals which comprises treating the metal with an optionally substituted 2-hydroxy-5-alkyl-benzaldoxime Wherein the 5-alkyl substituent contains from 7 to 13 carbon atoms.

We have now surprisingly found that certain metal complexes of these and other oximes have useful corrosion inhibition properties for a variety of metals.

The present invention discloses the inhibition of corrosion of metal I by treatment With a hydroxy oxime complex of metal II said hydroxy oxime including the structure:

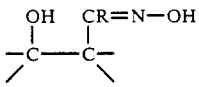

wherein R is hydrogen or a hydrocarbon (including substituted hydrocarbon) substituent. Without being bound by any mechanistic interpretation it is believed that metal I is required, for the purpose of this invention, to be capable of displacing metal II ions from the hydroxy oxime complex. This is best determined by small scale trial, as will be explained below, but generally it means that metal II is higher than metal I in the electrochemical series. It follows that metal I and metal II cannot be the same in a given system.

The metal complex is applied to the metal surface in the form of a solution in an organic solvent or as a dispersion of the complex in a suitable medium, for example in an oil based system in which the complex forms a pigment or an aqueous dispersion containing the complex. The process may be used as a temporary or permanent coating; as a pretreatment, primer or surface coating alone or in conjunction with other corrosion protection treatments.

The oxime is preferably water insoluble and the complex containing metal II should also be water insoluble. The two carbon atoms to Which hydroxy and oxide groups are attached may be part of an aliphatic or aromatic system, preferably including long chain ($C_7$–$C_{30}$) hydrocarbon groups to confer water insolubility.

Especially useful oximes have the structures:

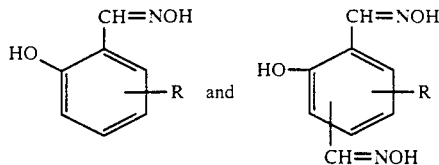

where R is $C_7$–$C_{22}$ hydrocarbon, including substituted hydrocarbon. Further preferred are 2-hydroxy-5-alkyl-benzaldoximes in which the alkyl group contains from 7 to 13 carbon atoms.

The 5-alkyl substituent may be linear or branched, saturated or unsaturated. Branched alkyl groups are especially preferred.

As optional substituents in the benzene ring of the 2-hydroxy-5-alkylbenzaldoxime there may be mentioned for example alkyl, aryl, alkoxy and aralkyl groups and more preferably halogen or nitro groups.

The metal complex is prepared by the reaction of a compound of metal II with the required oxime, the pH being subsequently raised above 6, preferably above 7, by addition of a base, for example an amine and preferably ammonia. This may be conveniently carried out in a solvent for both the metal II compound and the oxide. The solution of the complex may be used as such or the complex may be recovered by evaporation or precipitation and filtration and re-incorporated in a different solvent or dispersed in a suspending non-solvent medium such as an oil or aqueous emulsion.

Conventional organic solvents may be used for the metal oxime complex including for example alcohols and aliphatic and aromatic hydrocarbons. Especially preferred solvents are those having good wetting and evaporating properties and include for example ethanol, isopropanol, toluene, acetone, chloroform and 1,1,1-trichloroethane.

Aqueous dispersions of the metal-oxime complex may be formed in conventional manner using conventional dispersants and surfactants.

The process of the present invention is especially suitable for the corrosion inhibition of iron, zinc, copper, tin and aluminium and in particular mild steel as metal I. For protection of iron and steel, metal II is preferably zinc.

As a test for suitability of a given metal II for incorporation into a complex to treat metal I, a test solution of metal II complex should be applied to a clean surface of metal I.

A slow change of surface colouration is indicative of utility, which should be confirmed by corrosion testing using a formulated product. The surface colouration change will be similar to that observed when a solution of the uncomplexed oxime is applied to a metal I surface. Thus, iron surfaces treated with zinc oxime complexes slowly develop a violet colouration. Iron is a preferred metal I and zinc is a preferred metal II.

The metal oxime complex in solution or in dispersion form may be applied to the metal in conventional manner, for example, by dipping, spraying or brushing. The temperature of application may be from 0 to 50 deg. Celsius, although faster formation of the protective coating may take place at higher temperatures, for example 25 to 50 deg. Celsius.

Typically solutions of the metal oxime complex may contain from 0.1 to 10% by weight of zinc-benzaldoxime, whilst dispersion preferably contain from 0.1 to 5% by weight of complex. The presence of 0.1 to 2.5% by weight of complex in a surface coating formulation is generally sufficient to provide corrosion inhibition.

The process of the present invention may provide corrosion inhibition either without the application of a further surface coating or as a pre-treatment before the application of a further surface coating. Thus the treatments may be used for example as a temporary protection inhibitor whilst the metal is being transferred from one site to another.

If desired, the protective complex(es) may be removed by treatment with a suitable solvent, for example, one of the solvents mentioned above. Thus the process of the present invention may be used for the temporary protection of a metal surface and the protective coating subsequently dissolved before or during further processing.

Alternatively, the complex may be formulated in a surface coating composition, for example, a paint, primer, lacquer, resin or other protective coating. The surface coating may be a solvent based composition, for example a chlorinated rubber primer, or an aqueous dispersion system, for example primers or protective coatings based on polymer latices such as acrylic and styrene/acrylic latices and vinyl acrylic copolymer latices including acrylate modified with vinyl chloride-vinylidene chloride copolymer latices. The complex may also for example be incorporated in temporary alkali-removable protective coatings of the addition polymer type in which the polymer contains carboxyl groups, whether such compositions are solvent based or aqueous emulsion based or water dispersion based.

The invention is illustrated by the non-limitative following examples in which all parts and percentage are by weight unless otherwise stated.

EXAMPLE 1

Preparation of the zinc complex of 5-nonyl-2-hydroxybenzaldoxime.

To a stirred solution of 789 g of 5-nonyl-2-hydroxybenzaldoxime in 200ml methanol was added 65% g of zinc-acetatedihydrate. When the zinc-acetate-dihydrate had dissolved (pH 5.2), ammonia solution (s.g. 0.88) was added dropwise until the mixture was pH 7. The precipitated white solid was filtered off, washed well with methanol and dried at 40-45 deg. Celsius. Yield 537 g of white solid, mpt (melting point) 192 deg. Celsius.
Analysis
Calculated for a 1:2 complex: C,65.2; H,8.1; N,4.8; Zn,11.1 Found: C,62.5; H,8.0; N,4.4; Zn,12.8

EXAMPLE 2

Preparation of the zinc complex of 5-dodecyl-2-hydroxybenzaldoxime

The procedure of Example 1 was repeated except that 5-dodecyl TM 2-hydroxybenzaldoxime was used in place of 5-nonyl TM 2-hydroxybenzaldoxime.
Analysis
Calculated for a 1:2 complex: C,67.8; H,8.9; N,4.2; Zn,9.7 Found: C,64.5; H,9.2; N,3.9; Zn,12.9

EXAMPLE 3

Preparation of the zinc complex of 2,6-bis (oximinomethyl)-4-nonylphenol

To a stirred solution of 10.6 g 2,6-bis(oximinomethyl)-4-nonylphenol in 100ml methanol was added 10.5 g zinc acetate dihydrate. A precipitate immediately formed (pH 4.9). Ammonia solution (s.g. 0.88) was slowly added dropwise to pH 6.9. The solid product was filtered off, washed well with methanol and dried at 40-45 deg. Celsius. The product was insoluble in acetone, toluene and chloroform. Yield 8 g, mpt >280 deg. Celsius.
Analysis
Calculated for a 1:1 complex: C,55.1; H,6.7; N,7.6; Zn,17.7 Found: C,55.1; H,6.4; N,7.4; Zn,17.2

EXAMPLE 4

Preparation of the lead complex of 5-nonyl-2-hydroxybenzaldoxime

To a stirred solution of 26.3 g of 5-nonyl-2-hydroxybenzaldoxime. in 100ml methanol was added 20 g lead acetate trihydrate. When the lead acetate trihydrate had dissolved (approx. pH ammonia solution (s.g.0.88) was added dropwise until the mixture was pH 8.3. The precipitated solid was filtered off, washed well with methanol and air dried. Yield: 22 g, mpt: 170 deg. Celsius.
Analysis
Calculated for a 1:1 complex: C,40.9; H,5.1; N,3.0; Pb,44.2 Found: C,37.6; H,4.6; N,2.4; Pb,43.1

EXAMPLE 5

Bright mild steel 1 inch × 1 inch coupons of average weight 7.5 g were thoroughly washed with acetone followed by ethanol and stored in kerosene until required. Immediately prior to use they were washed in acetone.

A test coupon prepared as above was immersed in a 5% solution of the zinc TM benzaldoxime (produced from the reaction of 5-nonyl-2-hydroxybenzaldoxime with zinc acetate as described in Example 1 in 1,1,1-trichloroethane and then transferred to distilled water. A control coupon prepared in the same manner, but not treated with the zinc-benzaldoxime, was similarly immersed in distilled water. After 21 days, the test coupon had developed a slight violet-brown colouration and upon washing with acetone revealed only a trace of corrosion. A weight loss of 0.02% was recorded. In contrast, the control coupon was heavily rusted over its entire surface, and the weight loss was recorded as 0.64 %.

EXAMPLE 6

Bright mild steel 1 inch x 1 inch metal coupons were immersed in 10% solutions of anhydrous lanolin and a 50:50 mixture of anhydrous lanolin plus zinc benzaldoxime derived from 5-nonyl-2-hydroxybenzaldoxime in 1,1,1-trichloroethane. After allowing to air dry, the coupons were found to have coating weights of 3.03 and $3.10 \text{ g.m.}^{-2}$ respectively. The treated coupons were then immersed in 3% aqueous sodium chloride solution. After five days, the coupons were removed, cleaned and airdried. Weight losses recorded for coupons treated With unmodified lanolin and the 50:50 mixture were 0.06 % and 0.03 % respectively.

EXAMPLE 7

The procedure of Example 5 was repeated except that zinc-benzaldoxime complex derived from reaction of 5-dodecyl-2hydroxybenzaldoxime with zinc acetate was used as the corrosion inhibitor. The test coupon and control coupon were immersed in distilled water for 13 days after which the test coupon showed little rusting. A weight loss of 0.02% was recorded. The control coupon was heavily rusted and a weight loss of 0.4% was recorded.

EXAMPLE 8

Zinc-benzaldoxime derived from 5-nonyl-2-hydroxybenzaldoxime was added at a concentration of 5 % by weight to a solution of acrylic polymer in industrial methylated spirit at 8% solids. After thorough mixing, the polymer mix containing the zinc-benzaldoxime Was applied by brushing to the surface a mild steel panel and allowed to dry and harden for several hours. A control sample using the acrylic polymer solution but no zinc benzaldoxime was prepared in a similar manner. Both the test sample and the control were scratched with a large cross to penetrate the coatings and then fully immersed in distilled water for 10 days.

On removal and examination of the panels, it was seen that the test panel treated with the polymer containing the zinc-benzaldoxime showed slight signs of rusting within the confines of the scratch only. In contrast, the control panel that had been treated with unmodified polymer showed heavy rusting due to under-film attack emanating from the scratch as well as comprehensive film breakdown.

EXAMPLE 9

A mild steel panel was treated with the acrylic polymer solution containing the zinc complex derived from 2-hydroxy-5-nonyl-benzaldoxime as described in Example 8 and fully immersed in a 3% aqueous salt solution for 7 days.

On removal and examination, the test panel that had received treatment with the polymer solution containing the zinc-benzaldoxime showed slight signs of rusting within the confines of the scratch, whereas a control panel that had been treated with unmodified polymer showed very heavy rusting due to under-film attack emanating from the scratch as well as comprehensive film breakdown.

EXAMPLE 10

Bright mild steel 1 inch × 1 inch coupons were treated with the acrylic polymer solution containing the zinc-benzaldoxime complex as described in Example 8 and then fully immersed in a 3% aqueous salt solution. After 5 days, the coupons were removed and cleaned to reveal a bright shining surface similar in appearance to the original coupons. Modest corrosion was observed, and the weight loss was only 0.05%. In contrast coupons treated with the unmodified polymer solution were heavily rusted and a weight loss of 0.14 % was recorded.

EXAMPLE 11

Zinc-benzaldoxime derived from 5-nonyl-2-hydroxybenzaldoxime was added at a concentration of 0.5% by weight (2.4% on continuous phase) to a chlorinated rubber 'paint' system comprising resin, plasticiser, pigment/extender (titanium dioxide/barytes) and mixed solvent. The 'paint' was mixed using standard techniques and coated onto mild steel panels using a drawbar to ensure even reproducible coatings. Control samples using the chlorinated rubber system but containing no zinc-benzaldoxime were similarly prepared. After several days' drying, the panels were subjected to salt spray testing, according to ASTM specifications (B117, 1973).

After 200 hours continuous exposure, the panels were removed from the salt spray and examined. The test panels with coatings incorporating the zinc-benzaldoxime showed negligible rusting through the film and the metal surface was found to be bright with no sign of pitting corrosion. In contrast, panels treated with the chlorinated rubber coating with no Zinc-benzaldoxime showed moderate rust through the film, under film corrosion and light pitting corrosion.

EXAMPLE 1

Mild steel panels treated with a chlorinated rubber 'paint' system were assessed in the same manner as indicated in Example 11, except that the titanium dioxide was replaced by an equivalent weight of zinc phospate (PZ40), itself an anticorrosive pigment.

After 200 hours continuous exposure to salt spray, the coatings containing the zinc-benzaldoxime were noted to exhibit negligible rusting through the film, no rusting underneath the film and no sign of pitting corrosion. In contrast, panels treated with the chlorinated rubber coating containing zinc phospate alone (i.e. no zinc benzaldoxime) exhibited moderate rusting through the film, some rusting beneath the film and very extensive pitting.

EXAMPLE 13

The zinc benzaldoxime, prepared as in Example 1, was incorporated into paints by conventional procedures involving Red Devil milling to give paints with the following w/w % compositions:

|  | A | B | C | D | E |
|---|---|---|---|---|---|
| 55% medium oil linoleic alkyol solids content 50% | 42.3 | 42.1 | 42.5 | 42.6 | 42.7 |
| zinc-benzaldoxime derived from 5-nonyl-2-hydroxybenzaldoxime | — | 0.31 | 0.63 | 0.97 | 1.26 |
| Zinc phosphate | 10.6 | 10.5 | 10.6 | 10.7 | 10.7 |
| Talc | 8.0 | 8.0 | 8.0 | 8.0 | 8.1 |
| Barytes | 17.5 | 17.4 | 16.4 | 15.9 | 15.4 |
| Titanium dioxide | 8.0 | 8.0 | 8.0 | 8.0 | 8.1 |
| Additives and driers | 2.1 | 2.1 | 2.1 | 2.1 | 2.1 |
| White Spirit | 11.6 | 11.6 | 11.7 | 11.7 | 11.7 |

Paints were coated onto ground cold-rolled steel panels to give a dry film thickness (D.F.T.) of 30+/−3 microns, dried at room temperature for 35 days, scribed with a 60 mm vertical line, and subjected to the salt spray test (ASTM B117). After 13 days the blister rating (after ASTM D714) and maximum blister creep from the scribe were: A,4M,10 mm; B,8M,9 mm; C,7F,4 mm; D,8F,3 mm; E,9F,4 mm.

EXAMPLE 14

The zinc benzaldoxime, prepared as an Example 1, was incorporated into paints by conventional procedures involving Red Devil milling to give paints with the following w/w % compositions:

|  | A | B | C | D |
|---|---|---|---|---|
| 70% oil linseed alkyol solids content 75% | 23.9 | 23.9 | 24.1 | 24.2 |
| Zinc-benzaldoxime derived from 5-nonyl-2-hydroxybenzaldoxime | — | 0.53 | 1.07 | 1.52 |
| Talc | 7.7 | 7.8 | 7.8 | 7.9 |
| Barytes | 38.1 | 37.4 | 36.5 | 35.7 |
| Titanium dioxide | 7.7 | 7.8 | 7.8 | 7.9 |
| Additives and Driers | 1.5 | 1.5 | 1.5 | 1.5 |

-continued

|  | A | B | C | D |
|---|---|---|---|---|
| White Spirit |  | 20.7 | 20.8 | 20.9 | 21.0 |

Paints were coated onto ground cold-rolled steel panels (75×100 mm) using a 50 microns draw-down bar, dried at room temperature for 28 days, then subjected to the salt spray (ASTM B 117) test. After 11 days, blisters were assessed (according to ASTM D714) to be:
A,2D; B,8MD; C,8M; D,8F.

After 27 days, the paints were stripped from the lower half of the plates, and the percentage of metal area corroded estimated as:
A,>70; B,70; C,0; D,0.

EXAMPLE 15

Two 55% medium oil linoleic alkyd based paints, with pigment weight ration of barytes: talc: titanium dioxide of 3.9:1:1 were prepared by conventional methods to give a paint with a PVC content of 35%. In one preparation 2.6 parts of zinc complex of 2,6-bis(oximinomethyl)-4-nonylphenol (prepared as in Example 3) per 100 parts pigment plus extenders were added before milling. Ground cold-rolled steel panels coated with the paints were exposed to alternate one hour periods of dry air at 35 deg. Celsius, and a room temperature mist formed by a solution of ammonium sulphate (3.5 g/l) and sodium chloride (0.5 g/l) in water. After 31 days, rust spots were extensive on the coating without the zinc complex. In contrast the coating containing the zinc complex had very few rust spots.

EXAMPLE 16

Four paints with the following percentage compositions

|  | A | B | C | D |
|---|---|---|---|---|
| 55% medium oil linoleic alkyol solids content 50% | 42.3 | 42.1 | 42.5 | 42.6 |
| Lead benzaldoxime derived from 5-nonyl-2-hydroxybenzaldoxime | — | 0.8 | 1.6 | 2.4 |
| Talc | 7.6 | 7.6 | 7.7 | 7.7 |
| Barytes | 31.7 | 30.7 | 29.6 | 28.5 |
| Titanium dioxide | 7.6 | 7.6 | 7.7 | 7.7 |
| Additives and Driers | 2.0 | 2.0 | 2.0 | 2.0 |
| White Spirit | 11.0 | 11.1 | 11.1 | 11.2 | were coated onto cold-rolled steel panels and dried at room temperature for three days. Scribed and unscribed panels were subjected to salt spray testing (ASTM B117). The performances of the coatings were:

| | | Salt spray exposure time: | | | | |
|---|---|---|---|---|---|---|
| | | 144 hours | | | 300 hours | |
| Paint | D.F.T (um) | Unscribed B | Scribed B | BW | Scribed B | Unscribed BW |
| A | 26-28 | 7F-M | 7F-M | 1.5 | 3M | 3F-M | * |
| A | 15-19 | 7MD | 7MD | * | 0 | 0 | * |
| B | 15-19 | 8F | 8F | 1.5 | 6M | 4F-M | 2.5 |
| C | 15-18 | 8F | 8F | 1.0 | 6F-M | 6F | 1.5 |
| D | 17-20 | 10 | 10 | 0.5 | 8F | 8F | 1.0 |

B = blister after ASTM D714
BW = maximum blister creep from scribe (mm)
* = could not be assessed

EXAMPLE 17

Assessment of the zinc-benzaldoxime derived from 5-nonyl-2-hydroxybenzaldoxime by D.C. Polarization techniques.

17.1 Experimental Technique

The efficacy of the Zn-benzaldoxime as a corrosion inhibitor was tested using a electrochemical technique based on Direct Current Polarization. In these experiments the sample under test was made the working electrode of a three electrode cell. A saturated calomel reference electrode (S.C.E.) was used and the counter electrode was a platinum coil. The electrolyte used in the cell was 25mM $Na_2SO_4$ at pH 6.4, and the solution was aerated prior to the start of the experiment.

The coupons to be coated were of 99.5% pure iron measuring 22 ×6×0.5 mm. They were first degreased in acetone and then dipped into the appropriate solution, allowed to dry for ca. ½ hour and then re-dipped and allowed to dry for at least 72 hours before testing.

When the cell had been set up its open circuit potential was measured. Upon equilibrium (usually after 1 hour) the cell was connected to the potentiodyne and the potential was scanned from the open circuit value down to −0.8 volts and then back up to +0.1 volts (versus S.C.E.) in order to investigate the cathodic and anodic processes respectively. The scan rate used was 2 volts/hour and the data obtained was log [corrosion current] as a function of potential.

17.2 Zn-benzaldoxime film

Iron coupons were dipped in a 3% solution of the Zn-benzaldoxime in 1,1,1-trichloroethane, in the manner described above to produce films of thickness ca. 200nm. Results from D.C. Polarization experiments given in Table 1 show for each coupon tested the cathodic and anodic corrosion currents at −0.1 and +0.1 volts respectively from the open circuit potential (OCP).

TABLE 1

| Sample | Cathodic Current $mA/Cm^2$ −0.1 V from OCP | Anodic Current $mA/cm^2$ +0.1 V from OCP |
|---|---|---|
| 1. uncoated control | $3.9 \times 10^{-2}$ | $2.4 \times 10^{-1}$ |
| 2. uncoated control | $2.4 \times 10^{-2}$ | $2.4 \times 10^{-1}$ |
| 3. Zn-benzaldoxime film | $7.8 \times 10^{-3}$ | $7.8 \times 10^{-3}$ |
| 4. Zn-benzaldoxime film | $5.4 \times 10^{-3}$ | $9.5 \times 10^{-3}$ |

17.3 Coating of the Zn-benzaldoxime in an acrylic polymer

The Zn-benzaldoxime was added at a concentration of 5% by weight to a solution of acrylic polymer in industrial methylated spirits (as described in Example 8). After thorough mixing, iron-coupons were dip-coated in the polymer mix containing the Zn-benzaldoxime. Likewise control experiments were set up by dip-coating the iron coupons in the acrylic polymer solution containing no Zn-benzaldoxime. DC Polarization experiments were carried out as above and the cathodic and anodic corrosion currents at +/−0.1 volts from 0.C.P. are given in Table II.

TABLE II

| Sample | Cathodic Current mA/Cm² −0.1 V from OCP | Anodic Current mA/cm² +0.1 V from OCP |
|---|---|---|
| 1. acrylic polymer control | $1.75 \times 10^{-2}$ | $6.3 \times 10^{-2}$ |
| 2. acrylic polymer control | $1.55 \times 10^{-2}$ | $5.0 \times 10^{-2}$ |
| 3. acrylic polymer + Zn-benzaldoxime | $5.8 \times 10^{-5}$ | $5.4 \times 10^{-5}$ |
| 4. acrylic polymer + Zn-benzaldoxime | $7.0 \times 10^{-5}$ | $1.0 \times 10^{-4}$ |

We claim:

1. A process which comprises contacting a surface of a metal I with a hydroxy oxime of a metal II wherein the hydroxy oxime has the structure:

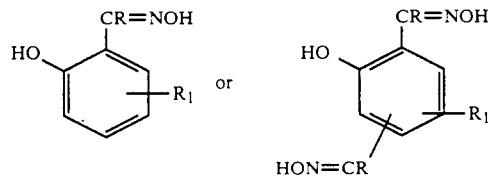

where
R is hydrogen, a hydrocarbon or a substituted hydrocarbon substituent;
$R_1$ is a hydrocarbon or a substituted hydrocarbon wherein the hydrocarbon group contains 7 to 22 carbon atoms;
metal II being selected such that metal I is capable of displacing metal II ions from the hydroxy oxime complex.

2. The process of claim 1 in which metal I is iron or steel and metal II is zinc or lead.

3. The process of claim 1 in which the hydroxy oxime complex is incorporated in a surface coating composition.

4. The process of claim 1 in which the hydroxy oxime is one wherein $R_1$ is an alkyl group containing from 7 to 13 carbon atoms.

5. The process of claim 1 wherein the metal I is selected from the group consisting of iron, zinc, copper, tin and aluminum.

6. The process of claim 5 wherein the hydroxy oxime is one in which $R_1$ is an alkyl group containing from 7 to 13 carbon atoms.

7. The process of claim 6 wherein the ring also includes further substitution selected from the group consisting of alkyl, aryl, alkoxy, aralkyl, halogen and nitro.

8. The process of claim 1 wherein $R_1$ is a hydrocarbon substituent.

* * * * *